United States Patent

Marumoto et al.

[11] 4,218,730
[45] Aug. 19, 1980

[54] TRANSISTOR SWITCHING APPARATUS FOR USE IN THE CONTROL OF A D.C. LOAD

[75] Inventors: Katsuji Marumoto; Tsutomu Ohmae, both of Ibaraki, Japan

[73] Assignee: Hitachi, Ltd., Japan

[21] Appl. No.: 959,099

[22] Filed: Nov. 9, 1978

[30] Foreign Application Priority Data

Nov. 9, 1977 [JP] Japan .................. 52-133462
Nov. 30, 1977 [JP] Japan .................. 52-142780

[51] Int. Cl.² ............................................. H02M 7/00
[52] U.S. Cl. ............................... 363/124; 318/332; 318/345 B; 318/722
[58] Field of Search ............... 307/253, 254, 300; 318/332, 341, 345 B, 722; 363/124, 131, 97

[56] References Cited

U.S. PATENT DOCUMENTS

| | | | |
|---|---|---|---|
| 3,484,652 | 12/1969 | Thiele | 318/341 X |
| 3,543,140 | 11/1970 | Krausser | 323/22 T |
| 4,032,833 | 6/1977 | Ibamoto et al. | 363/124 X |
| 4,095,127 | 6/1978 | Nerem | 307/253 |
| 4,109,167 | 8/1978 | Kaui et al. | 307/254 X |

Primary Examiner—William M. Shoop
Attorney, Agent, or Firm—Craig & Antonelli

[57] ABSTRACT

A power switching apparatus for use in the control of a D.C. load such as a D.C. motor comprises a power transistor with its emitter-collector path connected in series with the D.C. motor and a battery. A base current of the power transistor is supplied from the battery through a controllable impedance element. A control unit is provided to vary the impedance of the controllable impedance element in response to the current flowing through the emitter-collector path in such a manner that the base current changes as substantially the inverse-function of a characteristic curve indicating a D.C. amplification factor versus collector current of the power switch transistor.

11 Claims, 10 Drawing Figures

TRANSISTOR SWITCHING APPARATUS FOR USE IN THE CONTROL OF A D.C. LOAD

BACKGROUND OF THE INVENTION

This invention relates generally to a transistor switching apparatus for use in the control of a D.C. motor, and particularly to: improvements in controlling a base current flowing through a base-emitter path of a power switch transistor with its emitter-collector path connected in series with the D.C. motor.

Although the transistor switching apparatus according to the present invention is applicable to a wide variety of apparatus for supplying pulse current or voltage from a D.C. voltage source to a load, the description will be made of a control apparatus for a D.C. motor which is utilized in an electrically driven vehicle such as a golf cart, only for purposes of discussion but not in a limiting sense.

As discussed in the prior U.S. Pat. No. 3,517,292, it is conventional to control the operation of a D.C. motor by varying a resistance connected in series with the motor and the power source to control the effective voltage delivered to the motor. In such control apparatus, however, due to the power losses consumed in the resistance, unwanted heat is generated in the resistance and the efficiency of the control apparatus inevitably lowers.

To avoid such power losses and inefficiency, improved control systems have been proposed in which a power switch transistor is connected in series with the D.C. motor and the power source. The power switch transistor is controlled to turn on and off alternatively by a pulse current applied thereto. The control of a rotational speed of the D.C. motor is effected by varying a duty ratio of the pulse current applied thereto so that the desired average voltage can be developed across the D.C. motor.

In order to reduce power losses in the power switch transistor, it is desirable for the transistor to operate in a fully saturated region of operation when an "on" pulse is applied, and in a fully cut off state when an "off" pulse is applied to the power transistor. As a result, the transistor must have sufficient base drive to operate in the switching mode for low power dissipation. Usually a base current of the power transistor is selected to be sufficient for rendering the transistor operative in the fully saturated region at the maximum load current, i.e. the maximum armature current of the D.C. motor. Accordingly the base current is relatively large in value, and, thus, power losses due to the base current in a base drive circuit becomes relatively large.

In order to avoid such power losses, prior U.S. Pat. No. 3,617,845 has proposed a variable controlled current supply system wherein the power transistor is supplied with a base drive current which varies in its value in accordance with a load current flowing through the D.C. motor.

It is noted, however, that both of the patents mentioned above are typical of the prior art in that no attention is paid to the fact that a D.C. amplification factor of the power transistor usually varies with increases in its collector current. As discussed later in detail, when the collector current is small, the D.C. amplification factor of the transistor is relatively large so that the base current required for the transistor to operate in the saturated state of conduction becomes relatively small. Conversely, when the collector current is large, the amplification factor of the transistor is relatively small so that the base current required for the transistor to operate in the saturated region becomes relatively large.

It should be further noted that the prior devices pay no attention to the fact that the voltage of power sources such as a storage batteries tend to reduce with time, and, therefore, the base drive current will become insufficient for the power transistor to be in the fully saturated condition of conduction over a long period of time.

SUMMARY OF THE INVENTION

It is, therefore, a primary object of the present invention to provide a transistor switching apparatus which alternately operate in the fully saturated and the fully cut-off states of the emitter-collector conduction with minimized power losses and high efficiency so as to reduce the unwanted heat generated by the transistor.

Another object of the present invention is to provide a transistor switching apparatus for use in the control of a D.C. motor, in which the desired drive current is supplied to the base of the power transistor without regard to changes in the voltage of the power source.

These and other objects are achieved to one aspect of the present invention by varying the base current of the power switch transistor as an inverse function of a characteristic curve showing the D.C. amplification factor $h_{FE}$ of the power transistor with respect to the collector current thereof. In one embodiment of the present invention, the base current of the power switch transistor remains unchanged with an increase of the collector current from zero to a predetermined value and then increases in proportion to the collector current changing from the predetermined value to the maximum value.

According to another aspect of the present invention, a control unit is provided in which the power source voltage is compared with a voltage representative of the collector current of the power transistor to produce a control signal which is utilized to vary a resistance of a controllable element connected in series with a base-emitter path of the power transistor in such a manner that the desirable base drive current is supplied through the resistance to the power transistor.

Other objects, features and advantages of the present invention will become more apparent from the following detailed description of the preferred embodiment of the invention when taken in conjunction with the accompanying drawings.

DETAILED DESCRIPTION OF THE PREFERRED EMBODIMENT

Figure 1:
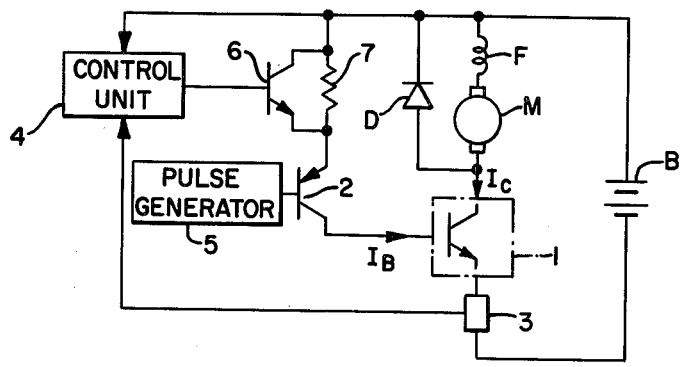
FIG. 1 shows a schematic view of the power switching apparatus according to the present invention used for the control of a D.C. motor.

Referring now to FIG. 1 showing a basic configuration of the present invention for use in the control of a D.C. motor, the D.C. motor M having a series field winding F is connected in series with a power transistor 1 across a storage battery B providing a source voltage $V_B$. A flywheel diode D is connected across the D.C. motor M including the field winding F. A current flow $I_C$ passing through an emitter-collector path of the power transistor 1 is detected by a current detector 3 and the detected signal is supplied to a control unit 4. The power transistor 1 is driven by an output of a drive transistor 2 which is connected at its base to a pulse generator 5. The emitter of the drive transistor 2 is connected to the battery B through a resistor 7, and its collector is connected to the base of the power transistor 1. The pulse generator 5 is adapted to provide on-off pulses, the duty ratio of which is variable in response to an instruction signal (not shown) for the control of the rotational speed of the motor. Both the transistors 1 and 2 operate in a fully saturated condition and in a fully cut-off condition of the emitter-collector conduction so as to provide a switch function. Connected across the resistor 7 is a transistor 6 which operates in a linear region of operation. That is, the impedance of the emitter-collector path of the transistor 6 varies substantially in a linear relation with the base current applied thereto. The control unit 4 is provided to deliver an output current which varies depending upon changes in both the source voltage $V_B$ and the detected collector current $I_C$ of the power transistor 1.

The operation of the control circuit shown in FIG. 1 is as follows. When the pulse generator 5 delivers an ON pulse, the drive transistor 2 is rendered conductive so that the base current $I_B$ is supplied from the battery B through the resistor 7 and the emitter-collector path of the transistor 2 to the base of the power transistor 1. This base current $I_B$ is selected in value for the power transistor 1 to be in the fully saturated state. When the power transistor 1 is rendered in its on-state, an electric current flows from the battery B through the motor M, the power transistor 1 and the current detector 3 so as to energize the D.C. motor to rotate.

On the other hand, when the pulse generator 5 delivers an OFF pulse to the base of the transistor 2, the transistor 2 is rendered in its off-state so that no base current flows into the power transistor 1. As a result, the power transistor 1 is also rendered in its cut-off state and thus no current flow is permitted to pass from the battery B to the D.C. motor M.

The current which has been passed through the motor M during the conduction of the power transistor 1 is attenuated by flowing in a closed circuit of the motor M, field winding F and flywheel diode D. The rotational speed of the D.C. motor can be varied by changing the ratio of ON-time to OFF-time of the power transistor switch 1 since the average current or voltage applied to the motor M varies depending upon the ratio mentioned above. An important feature of the present invention resides in providing the control unit 4 and a controllable impedance circuit including the transistor 6 and the resistor 7. The power transistor usually has such a characteristic that with an increase in the collector current $I_C$, a D.C. amplification factor $h_{FE}(=I_C/I_B)$ varies as shown by a curve (a) in FIG. 2. It is observed from this characteristic curve that the amplification factor $h_{FE}$ slightly increases with an increase in the collector current within the range near the origin, namely within the range of small collector current. It reaches a maximum at the collector current being equal to nearly from one-half to one-third of the maximum collector current Icmax, and then decreases with an increase of the collector current. This generally means that, in order for the power transistor to operate in the saturated state of its emitter-collector conduction, less base current $I_B$ is required for less collector current $I_C$. And, further, in order to minimize the power losses due to excessive base current, it is desirable for the base current $I_B$ to vary with an increase of the collector current $I_C$ as an inverse function of the characteristic curve (a), namely as a function of a curve (b) in FIG. 2. The control unit 4 is provided, as described later in detail, for causing the base current $I_B$ to change in accordance with the above-mentioned curve (b). To achieve this, the control unit 4 is adapted to vary the impedance of the emitter-collector path of the transistor 6 in response to the value of the collector current $I_C$ ($=I_E$) flowing through the power transistor 1. By suitably varying the conductivity of the emitter-collector path of the transistor 6, the power transistor can be supplied with the minimum base current required for the saturated condition of its emitter-collector conduction.

Figure 2:
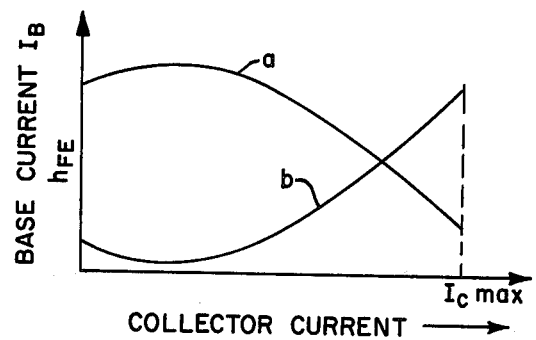
FIG. 2 shows characteristic curves indicating a D.C. amplification factor versus collector current of the power transistor and base current versus collector current thereof.

As a practical matter of fact, however, the provision of the base current exactly changing as the function of the curve (b) in FIG. 2 makes the circuit configuration of the control unit 4 complicated, and therefore, is less advantageous from the standpoint of costs. Therefore it is more convenient to use an approximation of the desired function. In other words, a simplified curve such as shown by (c) in FIG. 3 may be used for the base current $I_B$ to follow. According to this approximation, the base current $I_B$ supplied to the power transistor 1 is made constant at a relatively low level within the predetermined range of the collector current, and is made to increase in proportion to the collector current in the range where the collector current is greater than the predetermined value. The bending point of this curve (c) is preferably selected at the point near from one-half to one third of the maximum collector current Icmax. It is noted that in the case where the power transistor switch 1 is used for the control of a D.C. motor utilized for electric car such as a golf cart, the motor is usually designed to operate at a load current (nearly equal to the collector current) less than one-half of the maximum collector current of the power transistor except for the starting of the motor. Therefore, even though the approximation curve is utilized, substantially the same effect for reduction in power losses can be achieved as in the case of using the curve (b).

The description will now be made of a preferred embodiment of the present invention with reference to FIG. 4 in which the same reference numerals designate the like circuit elements as in FIG. 1.

Figure 4:
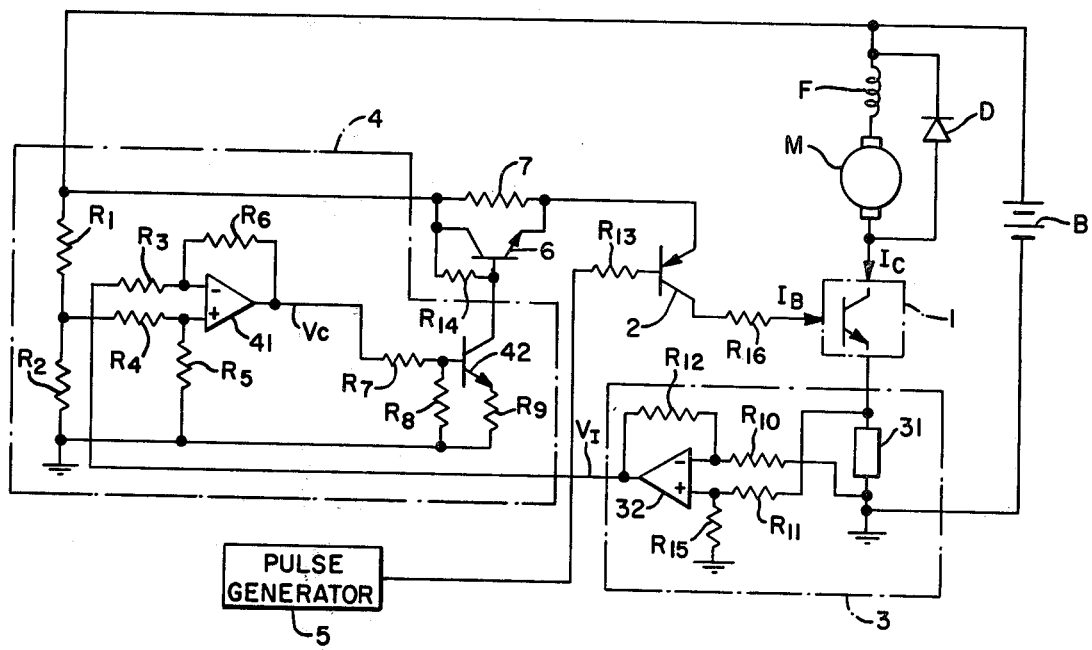
FIG. 4 is a circuit diagram showing a power switching apparatus for use with a D.C. motor of an embodiment of the present invention.

In FIG. 4, the transistor switching apparatus of the present invention comprises mainly a power transistor switch 1 and mean for controlling a base current $I_B$ of the power transistor 1. As a power transistor switch 1, either a single power transistor or plurality of power transistors connected in parallel with each other may be utilized. For the control of the base current $I_B$ of the power transistor switch 1, a current detector 3 and a control unit 4 are provided. The current detector 3 includes an impedance element 31 connected in series with the power transistor switch 1 and an operational amplifier 32 adapted to receive and amplify a voltage across the impedance element 31. The operational amplifier 32 has input resistors $R_{10}$, $R_{11}$ and a feedback resistor $R_{15}$ arranged in the usual connection manner. The voltage developed across the impedance element 31 is proportional in value to the collector current $I_C$ of the power transistor switch 1. The operational amplifier 32 functions to amplify the voltage across the impedance element 31 and delivers an output voltage substantially proportional to the collector current $I_C$. The current detector 3 is shown for illustrative purposes only, and any type of other detectors can be, of course, used in the well known manner.

The control unit 4 is comprised mainly of an operational amplifier 41 and a transistor 42, and functions to vary an impedance of the collector-emitter path of the transistor 6 in response to both the detected collector current $I_C$ and a change in the battery voltage $V_B$. The battery voltage $V_B$ is divided by means of a divider circuit consisting of resistors $R_1$ and $R_2$, and the voltage thus divided is applied through an input resistor $R_4$ to the minus input terminal of the operational amplifier 41. The positive terminal of the operational amplifier 41 receives the output voltage from the current detector 3 through an input resistor $R_4$. Connected between the input and output terminals of the operational amplifier 41 is a feedback resistor $R_6$. The operational amplifier 41 functions to amplify the difference between the output voltage of the current detector 3 and the battery voltage divided by the divider circuit. The output of the operational amplifier 41 is applied through a base resistor $R_7$ to the transistor 42 to render the transistor 42 conductive.

When the transistor 42 is made conductive, an electric current flows from the positive terminal of the battery B through a resistor $R_{14}$, the collector-emitter path of the transistor 42 and a resistor $R_9$ to ground. Thus a voltage drop is developed across the resistor $R_{14}$ so as to bias the transistor 6. The greater the voltage drop across the resistor $R_{14}$, the less conductive the collector-emitter path of the transistor 6 becomes. Thus, it is apparent that the transistor 6 functions as a variable impedance element whose impedance changes depending upon the current flowing through the resistor $R_{14}$. Through a parallel circuit consisting of the transistor 6 and the fixed resistor 7, the source voltage $V_B$ is applied to the emitter of the drive transistor 2. The fixed resistor 7 determines the minimum base current delivered to the power transistor switch 1. The base of the drive transistor 2 is connected through a base resistor $R_{13}$ to the pulse generator 5 while the collector thereof is connected through a resistor $R_B$ to the power transistor switch 1. As stated before, the conduction of the emitter-collector path of the transistor 2 varies in response to the pulse supplied from the pulse generator 5 so as to provide a switching function.

In operation, the impedance element 31 functions to detect a collector current $I_C$ as of an instant value in time. The operational amplifier 32 has an amplification gain expressed by $R_{12}/R_{10}$ and delivers an output voltage $V_I$. This voltage $V_I$ is applied to the operational amplifier 41 together with the source voltage $V_B$ divided by means of the resistors $R_1$, $R_2$, $R_4$ and $R_5$, so that the output voltage $V_C$ of the amplifier 41 is expressed as follows.

$$V_C = V_B \cdot \frac{R_2}{R_1 + R_2} \cdot \frac{R_5}{R_4} - \frac{R_6}{R_3} V_I \qquad (1)$$

Figure 3:
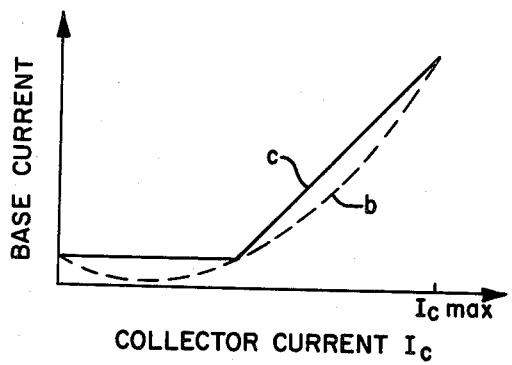
FIG. 3 shows an approximate curve of the D.C. amplification factor versus collector current characteristic of the power transistor.

In case the detected current $I_C$ is less than a predetermined value, the operational amplifier 41 delivers relatively high voltage which is sufficient to bring the transistor 42 to its saturated state of conduction. In this state, the electric current flows in a closed circuit including the voltage source B, the resistor $R_{14}$, the collector-emitter path of the transistor 42 and the resistor $R_9$. By the voltage drop across the resistor $R_{14}$, the transistor 6 is backward biased to its cut-off state. As a result, the power transistor switch 1 is supplied with a base current which is essentially determined by the fixed resistor 7 and $R_{16}$, and, thus, remains substantially constant as shown in FIG. 3.

On the other hand, in case the detected current $I_C$ becomes larger and thus the output voltage $V_C$ becomes smaller than the predetermined value, the transistor 42 goes out of the saturated condition of its collector-emitter conduction. In other words, the transistor 42 is brought to operate in the linear operating region, so that the smaller the output voltage $V_C$ applied to the transistor 42, the less conductive the collector-emitter path thereof becomes. When the collector-emitter path of the transistor 42 becomes less conductive, a smaller current flows through the resistor $R_{14}$ thereby developing a lower voltage drop there-across. As a result, the base potential of the transistor 6 rises so that the transistor 6 is rendered conductive, and exhibits low impedance between the collector-emitter path thereof. Since the source voltage $V_B$ is applied to the base of the power transistor switch 1 through the relatively low impedance of the collector-emitter path of the transistor 6 connected in parallel with the fixed resistor 7, the base current $I_B$ of the power transistor switch 1 increases. As will be readily appreciated, as the detected current $I_C$ becomes greater, the base current $I_B$ delivered into the power transistor switch 1 increases in proportion thereto, as shown in FIG. 3.

The following description will be made as an alternative explanation of the foregoing. In the case where the transistor 6 is being operated in the linear region rather than in the cut-off region, the relationship between the base current $I_B$ of the power transistor switch 1 and the battery voltage $V_B$ is expressed as follows.

$$V_B = V_{CE6} + V_{CE2} + V_{BE1} + V_S + I_B R_{16} \qquad (2)$$

where
$V_{CE6}$: saturation voltage of transistor 2
$V_{BE1}$: voltage across the emitter-collector of transistor 1
$V_S$: voltage drop across element 31, Usually $V_{CE6}$ and $I_B R_B$ can be assumed to be much greater than $V_{CE2}$, $V_{BE1}$ and $V_S$, the equation (2) is simplified as:

$$I_B \approx \frac{1}{R_{16}} (V_B - V_{CE6}) \qquad (3)$$

In the case where the detected current $I_C$ is greater than the predetermined value, the voltage $V_{CE6}$ across the emitter-collector of the transistor 6 decreases with the increase in the collector current $I_C$. Therefore, the base current $I_B$ increases substantially in proportion to the collector current $I_C$ of the power transistor switch 1.

Figure 5A:
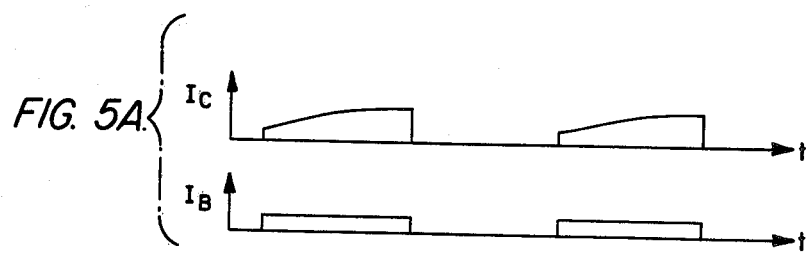
FIGS. 5A, 5B, 5C show waveforms of base current and collector current of the power transistor for the explanation of operation of the present invention.
Figure 5B:
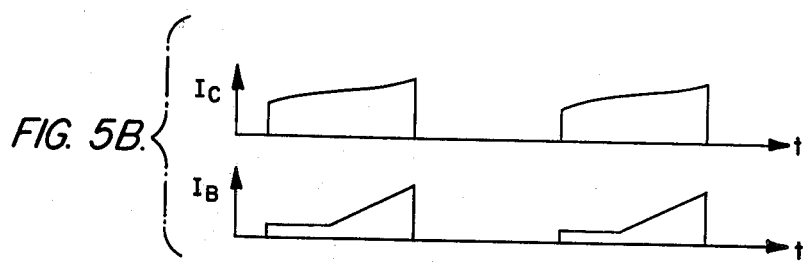
Figure 5C:
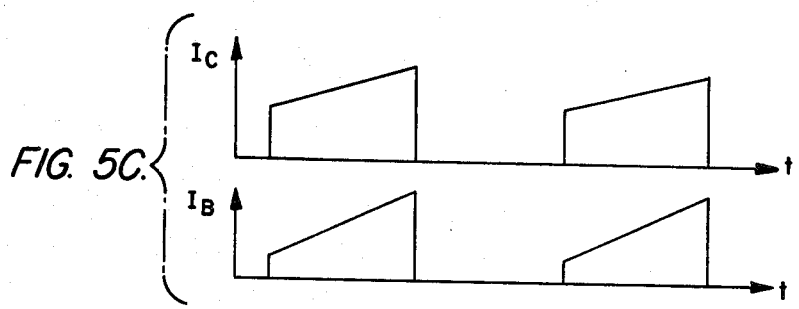

In accordance with the present invention, waveforms of the base current $I_B$ and the collector current $I_C$ of the power transistor 1 are changed as follows. In the case where the collector current $I_C$ is small, as shown by $I_C$ in FIG. 5A, the base current $I_B$ remains substantially constant at a relatively low level as shown by $I_B$ in FIG. 5A. FIG. 5B shows that when the collector current $I_C$ exceeds a certain level, the base current $I_B$ is made proportional to the increase of the collector current $I_C$. Further, FIG. 5C indicates that if the collector current $I_C$ is always over the certain level, the base current $I_B$ change will always be in proportion to the collector current $I_C$ during the ON time of the power transistor switch 1.

According to the present invention operation of the correction to the battery voltage is effected in the following manner.

In the case where the battery voltage $V_B$ is reduced because of its usage over a long period of time, the input voltage to the positive terminal of the operational amplifier 41 is also decreased. This will cause the transistor 42 to be less conductive so that less current is permitted to flow from the battery B through the resistor $R_{14}$, the transistor 42 and the resistor $R_9$ to ground. Thus, the collector potential of the transistor 42, as well as the base potential of the transistor 6, tends to rise thereby rendering the transistor 6 more conductive. As a result, with a decrease in the battery voltage $V_B$, the voltage $V_{CE6}$ across the collector-emitter path of the transistor 6 decrease correspondingly. Therefore the base current $I_B$ is kept at the desired level, as can be understood from the equation (3). This means that the changes in the battery voltage do not result in any undesirable influence to the base current $I_B$ in the present invention.

Figure 6:
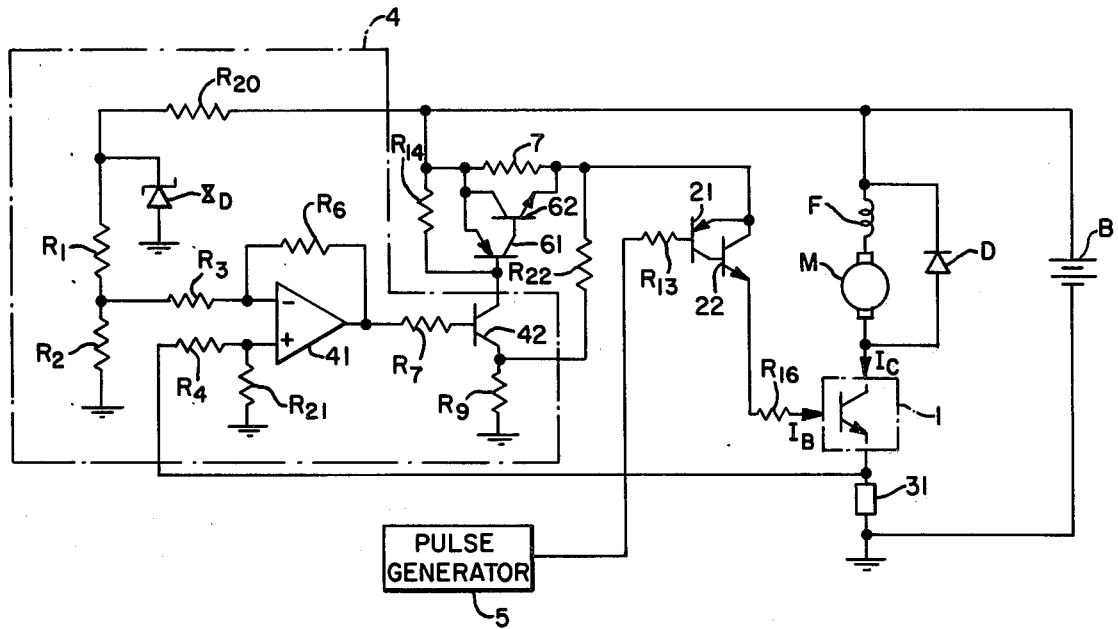
FIG. 6 is a circuit diagram showing another embodiment of the present invention.

FIG. 6 shows another embodiment of the present invention which has certain advantages: n the simplicity of its configuration. One of features of this embodiment resides in the use of a single operational amplifier 41 rather than two for controlling the base current $I_B$ of the power transistor switch 1. The impedance element 31 functions to detect the collector current $I_C$ of the power transistor 1 and the voltage developed across the element 31 is applied through the input resistor $R_4$ to the positive terminal of the operational amplifier 41. Connected across the voltage source B is a series circuit comprising a resistor $R_{20}$ and a zener diode $Z_D$ to produce a predetermined stable voltage. The stabilized voltage thus obtained across the zener diode $Z_d$ is divided by the divider circuit of the resistors $R_1$ and $R_2$ and then applied through the input resistor $R_3$ to the negative terminal of the operational amplifier 41. It is noted that in this embodiment, the detected voltage indicative of the collector current $I_C$ is applied to the positive terminal of the amplifier 41 while the battery voltage $V_B$ is applied to the negative terminal, unlike the first embodiment mentioned with reference to FIG. 4.

In operation, in case the detected voltage indicative of the collector current $I_C$ is smaller than a certain value which is determined by the zener diode $Z_C$ and the divider $R_1$, $R_2$, the operational amplifier 41 delivers no output voltage to the transistor 42. Therefore, the transistor 42 is rendered cut-off so that the transistors 61, 62 connected in the Darlington configuration are also rendered cut-off. In this case, the base current $I_B$ is supplied from the voltage source B through the fixed resistor 7, the drive transistors 21, 22 arranged in the Darlington connection, and the resistor $R_{16}$ to the power transistor switch 1. Therefore, the base current $I_B$ remains substantially constant. On the other hand, when the detected voltage representative of the collector current $I_C$ of the power transistor switch 1 exceeds the predetermined value being equal to $R_2/(R_1+R_2)$ $V_Z$ (where $V_Z$ denotes the zener voltage of the diode $Z_D$), the operational amplifier 41 delivers an output voltage proportional in value to the differences between two input voltages. Therefore, the transistor 42 is brough into its linear operating region. Thus, the current is permitted to flow through the closed circuit including the voltage source B, the resistor $R_{14}$, the collector-emitter path of the transistor 42 and the emitter resistor $R_9$ so as to develop a voltage drop across the resistor $R_{14}$. Due to this voltage drop, the transistors 61, 62 are forward biased to operate in the linear operating region. The greater the output voltage of the operational amplifier 41, the more the collector-emitter path of the transistor 62 becomes conductive. As a result, the base current $I_B$ of the power transistor switch increases in proportion to the collector current $I_C$ as shown by (c) in FIG. 3.

It will be understood from the foregoing that the embodiment shown in FIG. 6 provides substantially the same function as that in FIG. 4.

Although the present invention has been described referring to two embodiments, a variety of changes or modifications can be made without departing from the essential features of the present invention.

Figure 7:
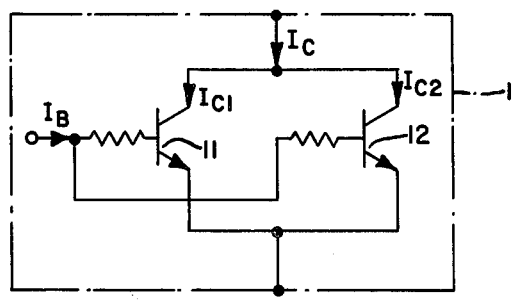
FIG. 7 shows a schematic view of power switch circuit having a plurality of power transistors.
Figure 8:
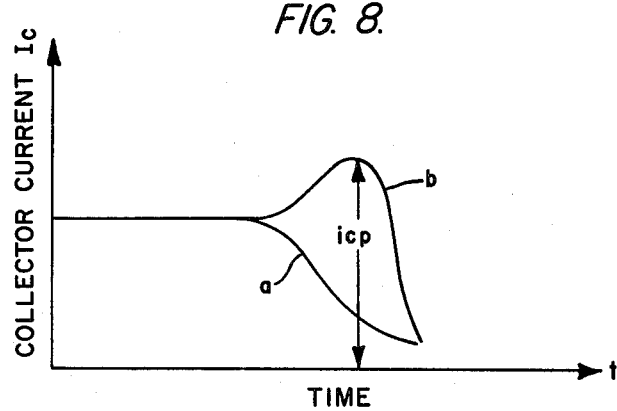
FIG. 8 shows a characteristic curve of collector current versus time at the turn-off of the power transistor.

By way of example, while the current detector 3 is connected to detect the collector current $I_C$ of the power transistor switch 1, in the above-mentioned embodiments it can also be arranged to detect an armature current $I_M$ of the D.C. motor M. The detection may be of either the average value or the instant value of the current. Further, as stated before, the power transistor switch 1 may include a plurality of power transistors 11, 12 connected in parallel with each other as shown in FIG. 7. In this case, the manner of controlling the base current $I_B$ in accordance with the present invention provides more advantageous effects than usual. As is well known, in cases where plural power transistors are used as a switching device, the falling time at the turn-off operation of the respective transistors becomes inevitably different from each other due to the differences in their characteristics. This means that when the power switch 1 turns off, one of the transistors 11 connected in parallel causes its collecter current $I_{C1}$ to change with time as indicated by a curve (a) in FIG. 8, while the other transistor 12 causes its collector current $I_{C2}$ to vary with time as shown by a curve (b) in FIG. 8, because of the differences in their turn-off times. It is a general tendency that the peak $i_{CP}$ of the turn-off current may become higher in case where the larger base current flows into the power switch transistor. In accordance with the present invention explained referring to FIG. 4 and FIG. 6, the base current $I_6$ for operating the power switch transistor is mininized so that the difference or unbalance in the base currents of the transistors may also be much reduced. As a result, the peak of the turn-off current can be greatly reduced in accordance with the present invention.

Although specific embodiments of the present invention have been shown as employing various NPN or PNP transistors connected in a particular way it will be understood by those skilled in the art that any transistor may be replaced by one of the opposite types with appropriate modification in the wiring connections. Accordingly, it is intended that appended claims embrace switching apparatus employing either PNP or NPN transistor.

We claim:

1. A transistor switching apparatus comprising:
   (a) a power switch transistor having a base, emitter and collector with its emitter-collector path connected in series with a D.C. power source and a load, said transistor operating alternatively in a saturation state and a cut-off state of its emitter-collector conduction for converting D.C. power to A.C. power delivered to said load;
   (b) a current detector for detecting an electric current flowing through the emitter-collector path of said power switch transistor;
   (c) a controllable impedance element connected between said base of the power switch transistor and the D.C. power source; and
   (d) a control unit coupled to the controllable impedance element to receive the current detected by the current detector and to cause a change in value of said controllable impedance element in response to said detected current so as to vary the base current to the power switch transistor as substantially the inverse function of a characteristic curve of a D.C. amplification factor versus collector current of said power switch transistor.

2. A transistor switching apparatus comprising:
   (a) a power switch transistor having a base, emitter and collector with its emitter-collector path connected in series with a D.C. power source and a load, said transistor having a D.C. amplification factor which varies with a collector current of the power switch transistor;
   (b) a current detector for detecting a current flowing through the emitter-collector path of said power switch transistor and converting the detected current to a voltage indicative of the detected current;
   (c) a drive transistor having a base, emitter and collector with its emitter-collector path connected between the base of the power switch transistor and the D.C. power source;
   (d) means for supplying an A.C. current to the base of said drive transistor to permit the emitter-collector path of the drive transistor to be in a saturated state and a cut-off state of conduction alternatively;
   (e) a controllable impedance element inserted in a path connecting the D.C. power source with the emitter-collector path of the drive transistor; and
   (f) a control unit coupled to the current detector means to receive the voltage indicative of said current detected by said current detector, for producing a control signal delivered to said controllable impedance element to vary its impedance in response to the detected current so that an electric current flowing from the D.C. power source through the controllable impedance element and the drive transistor to the base of the power switch transistor varies as substantially the inverse function of a characteristic curve of the D.C. amplification factor versus collector current of said power switch transistor.

3. A transistor switching apparatus comprising:
   (a) a power switch transistor having a base, an emitter and a collector with its emitter-collector path connected in series with a D.C. power source and a load;
   (b) a current detector for detecting an electric current flowing through the emitter-collector path of said power switch transistor and converting the current detected by said current detector into a voltage indicative of the detected current;
   (c) a controllable impedance circuit whose impedance varies in accordance with a control signal applied thereto;
   (d) a drive transistor having a base, an emitter and a collector with its emitter-collector path connected in series with said controllable impedance circuit between the base of said power switch transistor and said D.C. power source;
   (e) a pulse generator for producing variable duty cycle pulses applied to the base of said drive transistor; and
   (f) a control unit coupled to said D.C. power source, said controllable impedance circuit and said current detector for producing a control signal applied to said controllable impedance circuit to vary the impedance thereof in response to the detected current, said control unit including a divider circuit having resistors for dividing the voltage of the D.C. power source, and an amplifier means for amplifying a difference between the divided voltage and the voltage indicative of the current detected by said current detector, said amplifier means producing said control signal so that it remains substantially constant in level when the detected current is within a predetermined value and changes substantially in linear relationship with the detected current when the detected current is over said predetermined value.

4. A power switching apparatus as defined in claims 2, or 3 wherein said power transistor switch comprises a plurality of transistors connected in parallel with each other.

5. A power switching apparatus as defined in claims 2, 3 or 4, wherein said current detector comprises an impedance element connected in series with the emitter-collector path of the power switch transistor to develop a voltage proportional in value to a current flow therethrough.

6. A power switching apparatus as defined in claims 2, 3 or 4, wherein said controllable impedance element comprises at least one transistor having a base, an emitter and a collector with its emitter-collector path connected across a fixed resistor, said base being applied with a control signal from the control unit.

7. A power switching apparatus as defined in claim 3, wherein the divider circuit includes a pair of resistors connected in series across the D.C. power source to deliver an output voltage developed across one of said resistors and a zener diode connected in parallel to the series circuit of said pair resistors.

8. A power switching apparatus as defined in claim 3, wherein said amplifier means comprises an operational amplifier having a positive input terminal and a negative input terminal, a first input resistor connected to the positive input terminal, a second input resistor connected to the negative input terminal, and a feedback resistor connected across one of said input terminals and an output terminal of the operational amplifier.

9. A power switching apparatus as defined in claim 8, wherein the divided voltage is applied through the first input resistor to the positive input terminal of the operational amplifier while the voltage indicative of the detected current is applied through the second input resistor to the negative input terminal of the operational amplifier.

10. A power switching apparatus defined in claim 9, wherein the divided voltage is applied through the second input resistor to the negative input terminal of the operational amplifier while the voltage indicative of the detected current is applied through the first input resistor to the positive input terminal of the operational amplifier.

11. A power switching apparatus as defined in claim 9, wherein the current detector comprises:
an impedance element connected in series with the emitter-collector path of the power switch to develop a voltage proportional in value to a current flow therethrough; and
a voltage amplifier having a pair of inputs coupled across the impedance element and an output coupled to the second input terminal of the operational amplifier.

* * * * *